Feb. 2, 1937.    H. GILBERT    2,069,523
DETACHABLE HANDLE
Filed July 29, 1936
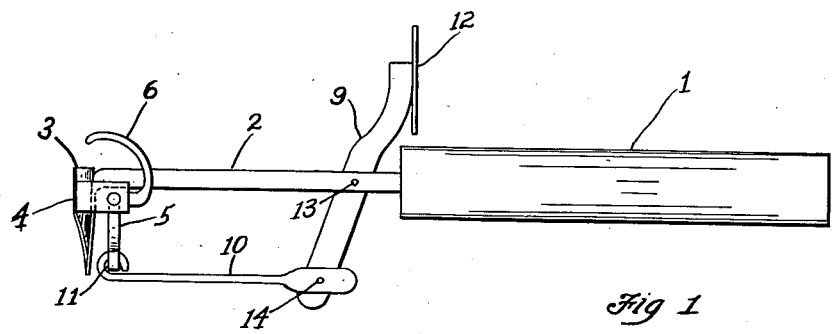
Fig 1
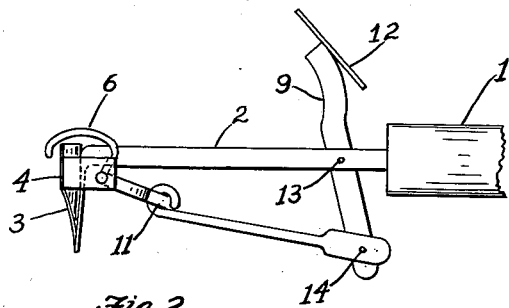
Fig 2
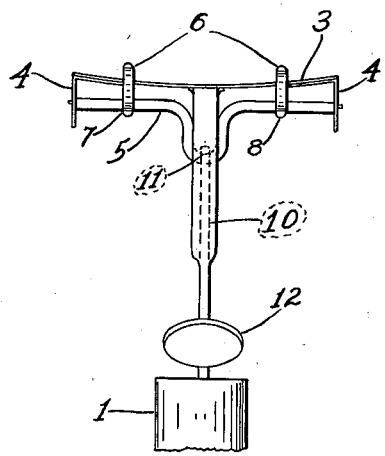
Fig 3
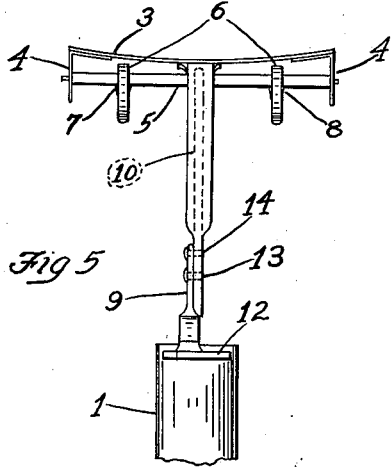
Fig 4
Fig 5
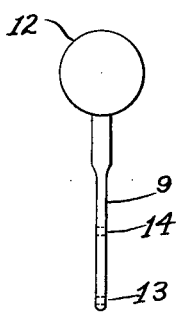
Fig 6
INVENTOR.
Henry Gilbert
BY Lloyd C. Root.
ATTORNEY.

Patented Feb. 2, 1937

2,069,523

UNITED STATES PATENT OFFICE 2,069,523

DETACHABLE HANDLE

Henry Gilbert, Mansfield, Ohio

Application July 29, 1936, Serial No. 93,227

4 Claims. (Cl. 294—31)

This invention relates as indicated to detachable handles, and more particularly to that type of handle which may be used on the kitchen utensils, such as pots, pans and the like.

The principal object of my invention is to provide a handle with certain mechanism attached thereto for the purpose of grasping the rim of a receptacle, such as those mentioned above.

Another object of my invention is to provide means for handling receptacles, which may have become heated, in an easily and efficient manner.

Other objects of this invention will appear as the description proceeds.

To the accomplishment of the foregoing and related ends, said invention then consists of the elements hereinafter fully described and particularly pointed out in the claims.

The annexed drawing and the following description set forth in detail certain structure embodying the invention such described elements constituting, however, but one of various mechanical forms in which the principle of the invention may be used.

In said annexed drawing:

Fig. 1 represents a side elevational view of my improved detachable handle, showing the grasping means in an open position.

Fig. 2 shows a similar side view disclosing, however, the grasping element in its closed position.

Fig. 3 is a top view similar to Fig. 2.

Fig. 4 represents the arcuate brace.

Fig. 5 shows a top view similar to Fig. 1, showing the grasping element in the open position.

Fig. 6 is a front elevational view of the lever which is used to operate the grasping elements.

Various handles of this general type have come into use from time to time, but due to the complexity of their construction, attempts to manufacture and market those handles have been somewhat unsuccessful.

It is a well known fact, paricularly among housewives, that pots, pans or other utensils commonly used for cooking purposes often become quite hot, necessitating the use of a cloth or some other protecting means when said utensil is desired to be moved. If, however, a permanent handle is attached to the receptacle, this also frequently becomes as hot as the utensil itself, still necessitating the use of some protecting means when the particular receptacle is handled.

My improved detachable handle overcomes all of the hardships necessarily connected with the handling of the heated receptacles, due to the fact that it may be used to grasp the rim of such receptacle, regardless of its size or shape. It may be used efficiently on square or oval shaped utensils as well as round ones, as will be more clearly seen in the following detailed description.

Referring now more particularly to the drawing, and more especially to Fig. 1, the part of the handle which is to be grasped by the hand, and which, it may be understood, may be made in any desired shape is denoted by the numeral 1. Extending forwardly from the end of said handle, 1, is a small shaft, 2, which has secured to its forward end a brace, 3, which may be in the form of an arc so as to hold more securely those receptacles which are round or oval in form.

To either end of said brace, 3, is attached a similar plate or ear, 4. Located between these ears and connected thereto is a shaft, 5, which in its usual form has a dropped center, as more clearly shown in Fig. 3.

The grasping means which is formed to loop over the rim and firmly hold a receptacle is denoted by the numeral 6. It is understood, of course, that instead of having a series of small elements such as is shown in the drawing, it is within the scope of my invention that a single solid piece may also be used to advantage, extending the width which is occupied by the two elements shown in the drawing.

These grasping elements, 6, are secured to the shaft, 5, at points 7 and 8. In order that these elements may perform their function easily and efficiently, a lever arm has been provided which is pivotally mounted on the shaft, 2, and denoted by the numeral 9. At or near the bottom end of the said shaft, 9, is pivotally secured a link, 10, which connects said lever, 9, to the shaft, 5, at the point, 11.

To enable the operation to be made as simple as possible, a flat plate or disc, 12, is secured to the upper end of the lever, 9. It will be obvious at this point that by grasping the handle, 1, firmly and placing the brace, 3, against the rim of the receptacle which is to be moved, placing the thumb against the disc, 12, and pushing on said disc, the elements, 6, will close over the rim of the receptacle, thus holding it firmly in position and allowing it to be moved.

A number of various ways have been devised to connect the shaft 5, with the lever 9; however, during my experience, it has been found that the particular construction shown in Fig. 5 is the most desirable. It will be noted here that the lever, 9, is slightly off center in relation to the disc, 12, to allow the lever, 9, to be pivotally mounted on the shaft, 2, at point, 13. When this construction is used, the bottom end of the lever, 9, may be pivotally mounted to the link, 10, at point, 14; thus enabling the entire operating mechanism to become aligned.

Other forms may be employed embodying the features of my invention instead of the one here explained, change being made in the form or construction, provided the elements stated be any of the following claims or the equivalent of such stated elements being employed.

I, therefore, particularly point out and distinctly claim as my invention:

1. A detachable handle of the character described comprising in combination a handle, a shaft extending forwardly therefrom, an arcuate brace rigidly secured to the forward end of said shaft, ears secured to and extending horizontally and rearwardly from either end of said brace, a horizontal rod, having a dropped center, rotatably mounted between said ears, a plurality of fingers secured to said rod and means operable to engage said fingers with the rim of a receptacle.

2. A detachable handle of the character described comprising in combination a handle, a shaft extending forwardly therefrom, an arcuate brace rigidly secured to the forward end of said shaft, ears secured to and extending horizontally and rearwardly from either end of said brace, a horizontal rod, having a dropped center, rotatably mounted between said ears and situated behind said brace and below said shaft, a plurality of fingers secured to said rod and means operable to engage said fingers with the rim of a receptacle.

3. A detachable handle of the character described comprising in combination a handle, a shaft extending forwardly therefrom, an arcuate brace rigidly secured to the forward end of said shaft, ears secured to and extending horizontally and rearwardly from either end of said brace, a horizontal rod, having a dropped center, rotatably mounted between said ears, a plurality of fingers secured to said rod and means operable to engage said fingers with the rim of a receptacle including a lever-arm pivotally mounted on said shaft and connected at its lower end by a link to said rod.

4. A detachable handle of the character described comprising in combination a handle, a shaft extending forwardly therefrom, an arcuate brace rigidly secured to the forward end of said shaft, ears extending rearwardly from either end of said brace and situated substantially below said shaft, and means mounted between said ears and below said shaft including a rod having a dropped center, manually operable to engage the rim of a receptacle.

HENRY GILBERT.